United States Patent

Matsunaga et al.

[11] Patent Number: 5,296,580
[45] Date of Patent: Mar. 22, 1994

[54] STRETCH PACKAGING METHOD EMPLOYING MULTI-LAYER FILM

[75] Inventors: Takashi Matsunaga; Keiichi Miura, both of Chiba, Japan

[73] Assignee: Mitsui Petrochemical Industries, Ltd., Tokyo, Japan

[21] Appl. No.: 97,921

[22] Filed: Jul. 28, 1993

Related U.S. Application Data

[63] Continuation of Ser. No. 216,217, Jul. 7, 1988, abandoned.

[30] Foreign Application Priority Data

Jul. 7, 1987 [JP] Japan ................ 62-169501

[51] Int. Cl.$^5$ .................. B65B 11/08; C08F 210/14
[52] U.S. Cl. .................................. 528/502; 428/339; 428/516; 526/348.1; 526/348.5; 526/348.3; 526/348.6; 524/474; 524/483; 53/441
[58] Field of Search .............. 528/502; 53/441; 526/348.1; 524/474, 483; 428/339, 516

[56] References Cited

U.S. PATENT DOCUMENTS

| | | | |
|---|---|---|---|
| 3,867,806 | 2/1975 | Lancaster, III et al. | 53/27 |
| 4,050,221 | 9/1977 | Lancaster, III et al. | 53/211 |
| 4,077,179 | 3/1978 | Lancaster et al. | 53/32 |
| 4,232,501 | 11/1980 | Stackhouse | 53/399 |
| 4,418,114 | 11/1983 | Briggs et al. | 428/218 X |
| 4,499,706 | 2/1985 | Scheller | 53/441 X |
| 4,518,654 | 5/1985 | Eichbauer et al. | 428/331 |
| 4,658,568 | 4/1987 | Reid et al. | 53/441 X |
| 4,668,752 | 5/1987 | Tominari et al. | 526/348.5 X |
| 4,833,017 | 5/1989 | Benoit | 53/441 X |

FOREIGN PATENT DOCUMENTS

| | | | |
|---|---|---|---|
| 0009376 | 4/1980 | European Pat. Off. | |
| 57-13442 | 3/1982 | Japan | B65B 11/04 |
| 58-7524 | 2/1983 | Japan | B65B 11/04 |
| 60-88016 | 5/1985 | Japan | C08F 210/16 |
| 2084168 | 4/1982 | United Kingdom | |

OTHER PUBLICATIONS

Schwartz, Plastics Materials and Processing, Van Nostrand Reinhold Co., Inc., N.Y., 18, 1982.

Primary Examiner—Fred Teskin
Attorney, Agent, or Firm—Sherman and Shalloway

[57] ABSTRACT

A film for stretch packaging comprising as a substrate a film of a linear low density polyethylene having a melt flow rate (190° C.), as measured by an ASTM-D-1238E method, of 0.3 to 8 g/10 min., a density, as measured by an ASTM-D-1505 method, of 0.900 to 0.918 g/cm$^3$, a molecular weight distribution ($\overline{Mw}/\overline{Mn}$) of 2 to 6, two or more melting points existing as measured by a differential scanning calorimeter, a maximum melting point $Tm_1$ of 118° to 125° C. and a ratio of the height $Tm_1H$ of the peak of the highest melting point $Tm_1$ to the height $Tm_1H$ of the melting point $Tm_2$ adjacent thereto (i.e., $Tm_1H/Tm_2H$), of 1.3 or less.

7 Claims, No Drawings

STRETCH PACKAGING METHOD EMPLOYING MULTI-LAYER FILM

This application is a continuation of application Ser. No. 07/216,217, filed Jul. 7, 1988 now abandoned.

BACKGROUND OF THE INVENTION

1. Field of the Invention

The present invention relates to a film derived from a linear low density polyethylene and used for stretch packaging.

2. Description of the Related Art

Stretch packaging methods have been proposed in which packaging is performed by winding stretchable band-shaped plastic film around articles to be packaged while stretching the films according to known stretching methods (e.g., Japanese Examined Patent Publication (Kokoku) Nos. 57-13442 and 58-7524). In these methods, highly stretchable stretch films are used to effect high stretch packaging or irregular shape packaging.

Examples of such films used for stretch packaging in the prior art are low density polyethylene, ethylene/vinyl acetate copolymer, and linear low density polyethylene.

According to the prior art methods, the stretch packaging machines stretch films by only about 30% during packaging, and recently, to reduce packaging costs, a stretch packaging machine capable of stretching a film by about 300% has been proposed. But, a single layer or composite stretch film composed of the above-mentioned low density polyethylene or ethylene-vinyl acetate can be stretched to a limit of about 150%, and therefore, a problem arises in that the film may be broken at a higher degree of stretching.

Also, in the case of a film composed of a linear low density polyethylene, the setting of the conditions for stretching by 300% or higher is severe, and even if stretching by 300% or higher is possible, too much stress may be applied to the packaged article after packaging, and thus the packaged article is deformed, or the film stretched to an irregular shape, whereby the appearance after packaging becomes undersirable. To solve this problem, the density of the linear low density polyethylene can be lowered, but if only the density is lowered, the starting material pellets or the film may become very sticky, thereby causing problems during the production thereof and in the handling of the packaged product after packaging. Also, although the stretch film has an inherent tackiness, an excessive tackiness will cause problems during the production of the film, and thus the film yield may be lowered.

SUMMARY OF THE INVENTION

Accordingly, the objects of the present invention are to solve the above-mentioned problems of the prior art and to provide a film for stretch packaging capable of being highly stretched, without the application of an excessive stress on the packaged article, having a satisfactory strength and appearance after packaging, and furthermore, the pellets and the films are not excessively sticky.

Other objects and advantages of the present invention will be apparent from the following description. In accordance with the present invention, there is provided a film for stretch packaging comprising, as a substrate, a film of a linear low density polyethylene having a melt flow rate (190° C.), as measured by an ASTM-D-1238E method, of 0.3 to 8 g/10 min., a density, as measured by an ASTM-D-1505 method, of 0.900 to 0.918 g/cm$^3$, a molecular weight distribution ($\overline{M}w/\overline{M}n$) of 2 to 6, two or more melting points existing as measured by a differential scanning calorimeter, a maximum melting point $Tm_1$ of 118° to 125° C., and a ratio of the height $Tm_1H$ of the peak of the highest melting point $Tm_1$ to the height $Tm_2H$ of the melting point $Tm_2$ adjacent thereto (i.e., $Tm_1H/Tm_2H$) of 1.3 or less.

DESCRIPTION OF THE PREFERRED EMBODIMENTS

The linear low density polyethylenes usable in the present invention include a linear low density polyethylene or L-LDPE, for example, a copolymer of ethylene and an α-olefin as described in Japanese Unexamined Patent Publication (KOKAI) No. 60-88016.

Such an ethylene/α-olefin copolymer includes a random ethylene/α-olefin copolymer having a substantially linear structure composed of ethylene and an α-olefin having 4 to 20 carbon atoms. The α-olefin units contain an α-olefin having 4 to 10 carbon atoms, preferably 6 to 10 carbon atoms, which may be a mixture of one or more kinds of these α-olefins. Specific examples of such α-olefin units may include 1-butene, 1-pentene, 1-hexene, 4-methyl-1-pentene, 1-heptene, 1-octene, 1-decene and the like. The content of the α-olefin units constituting the above ethylene/α-olefin may be generally 0.5 to 40 mol %, preferably 0.5 to 30 mol %, particularly 1.5 to 20 mol %.

The above-ethylene/α-olefin copolymer has a substantially linear structure. The term "substantially linear structure" as used herein denotes a linear structure having a branching based on the above-mentioned α-olefin and having no long chain branching and a crosslinked structure. This can be confirmed by completely dissolving the above-mentioned ethylene-α-olefin copolymer in n-decane solvent at a temperature of 130° C.

The linear low density polyethylene usable in the present invention has a melt flow rate (i.e., MFR) (190° C.) of 0.3 to 8 g/10 min., preferably 0.5 to 5 g/10 min., a density of 0.900 to 0.918 g/cm$^3$, preferably 0.900 to 0.915 g/cm$^3$, a molecular weight distribution ($\overline{M}w/\overline{M}n$) of 2 to 6, preferably 2.3 to 5, two or more melting points existing as measured by a differential scanning calorimeter, a maximum melting point $Tm_1$ of 118° to 125° C., preferably 118° to 124° C. and a ratio of the height of the peak of the highest melting point $Tm_1$ to that of the melting point $Tm_2$ adjacent thereto, of 1.3 or less, preferably 1.0 or less.

In the present invention, the melting points are measured by a differential scanning calorimeter (produced by Perkin Elmer Co., Model DSG-2) by maintaining a sample molded into a sheet with a thickness of 0.5 mm, at 473° K for 10 minutes, lowering the temperature at a falling speed of 20° C. to 320° K, and then recording the melting points $Tm_1$, $Tm_2$, ... $Tm_i$ obtained by raising the temperature at an elevation speed of 10° C.

In the present invention, the molecular weight distribution, $\overline{M}w/\overline{M}n$ is determined according to a method described in "Gel Permeation Chromatography" by Mr. Takeuchi, Maruzen (Japan) as follows.

(1) Standard polystyrene having a known molecular weight (single dispersed polystyrene available from Toso, Japan) is used to determine the molecular weights M and the counts of the GPC (i.e., Gel Permeation Chromatography). From the resultant data, the correlated calibration curve between the molecular weight M and the elution volume EV. The concentration is 0.02% by weight.

(2) The GPC chromatograph of a sample is obtained by a GPC measurement and the number-average molecular weight $\overline{M}n$ and the weight-average molecular weight $\overline{M}w$ are calculated from the above-mentioned correlation (1) and the $\overline{M}w/\overline{M}n$ value is obtained therefrom.

The sample preparation conditions and the GPC measurement conditions are as follows.

Sample Preparation (a) The sample is taken in an Erlenmeyer flask together with o-difluorobenzene in such an amount that the sample concentration is 0.1% by weight.

(b) The Erlenmeyer flask is heated to a temperature of 140° C. and the mixture is stirred for about 30 minutes to dissolve the sample in the solvent.

(c) The resultant solution is subjected to GPC.

(Remarks) The below-mentioned apparatus manufactured by Waters Co. is provided with a 0.5 μm metal filter and the GPC measurement is carried out for the filtrate passed through the filter.

GPC Measurement Condition (a) Apparatus: 150C-ALC/GPC manufactured by Waters Co.
(b) Column: Type GMH manufactured by Toso
(c) Sample volume: 500 μl
(d) Temperature: 140° C.
(4) Flow rate: 1 ml/min.

The above-mentioned limitations of the linear low density polyethylene, i.e., the melt flow rate, the density, the molecular weight distribution, the melting point, and the ratio $Tm_1H/Tm_2H$ are required for the present invention for the following reasons.

The film for stretch packaging according to the present invention is composed of the above-mentioned linear low density polyethylene, but another resin component or additive, etc., also may be formulated therein.

To prepare a film from the above-mentioned linear low density polyethylene, conventional film forming methods such as the inflation system or the T-die system can be used, whereby a film with a thickness of 15 to 60 μm is formed.

The film for stretch packaging according to the present invention, preferably has a tensile elongation at break in the longitudinal direction of 300% or more, an impact strength of 2500 kg·cm/cm$^2$ or more, a tear strength in the longitudinal direction of 50 kg/cm or more, a tackiness (20 kg, 50° C.) of 3 to 25 g/cm, a force of 150 to 300 g/15 mm one hour after stretching to 300%, and a maximum stretching limit of 300% or more.

The film for stretch packaging according to the present invention has a greater tensile elongation than the film of the low density polyethylene or the ethylene/α-olefin copolymer of the prior art and can be stretched by about 300 to 600%, and therefore, is suitable for high stretch stretch packaging or irregular shape articles. Also, compared with the linear low density polyethylene of the prior art, the stress on the packaged product is lower so that the packaged article will not be deformed, and has a greater strength after packaging as well as a good appearance. In addition, the starting material pellets and the film are not sticky, and thus provide an excellent productivity and ease of handling.

The film for stretch packaging according to the present invention has a sufficient necessary tackiness (stickiness) and it is not necessary to formulate a tackifier such as ethylene/vinyl acetate copolymer, which is detrimental to the stretchability of the film. But, if a greater tackiness is required, it is possible to make a linear low density polyethylene film formulated with about 2 to 20% by weight of, for example, liquid polybutadiene or polyisobutylene.

Further, when both a non-tacky surface and a tacky surface are desired, it is possible to make a multi-layer film comprising a linear low density polyethylene with a higher density than the linear low density polyethylene to be used in the present invention, and having a thickness of about 5 to 30% of the total thickness, for the non-tacky surface, the linear low density polyethylene usable in the present invention for the intermediate layer, and the linear low density polyethylene usable in the present invention formulated with 2 to 10% by weight of liquid polyisobutylene or liquid polybutadiene with a thickness of about 5 to 30% of the total thickness for the tacky layer, and to laminate these film to one another.

According to the present invention, since a linear low density polyethylene having specific physical properties is used for a film for stretch packaging, the film can be highly stretched, has an adequate degree of tackiness, does not apply an excessive stress to the packaged article after packaging, has a satisfactory strength after packaging, and the pellets and the film are not excessively tacky, and thus the film has an excellent productivity, packaging ability, and ease of handling.

EXAMPLES

The present invention will now be further illustrated by, but is by no means limited to, the following Examples.

EXAMPLES 1-4 AND COMPARATIVE EXAMPLES 1-4

Linear low density polyethylenes (ethylene/α-olefin copolymers) having the compositions and the physical properties shown in Table 1 were used to produce band-shaped films having a thickness of 2 μm and a width of 500 mm, by molding with a film molding machine (90ϕ cast molding machine, die width 1500 mm) at a take-up speed of 70 m/min.

The physical properties of the films obtained, and the results of the stretch packaging tests by a stretch packaging machine using the obtained films, are shown in Table 1. The article to be packaged was a irregular wire-wound laminated product in a sandwiched shape, i.e., a corrugated box 90 cm×90 cm×40 cm was laminated between two corrugated boxes 120 cm×120 cm×40 cm.

In Table 1, the tensile strength at break and the tensile elongation at break were measured by JIS Z1702 (tensile speed 500 mm/min.), the impact strength by ASTM D3420, and the tear strength by JIS Z1702. The tackiness was determined by measuring the peel-off strength of films superimposed on one another, by leaving the films to stand under a load of 20 kg at 50° C. for one day, and thereafter, measuring the strength needed to peel the films apart. The force after a 300% stretching is the residual force after the 300% stretching stage was maintained. The irregular packaging ability was evaluated by observing cutting at the corners and the sagging at the concave portion when the above irregular article was packaged, according to the following standards.
⊚: excellent, o: good, Δ: acceptable,
x: unacceptable As is clear from the results shown in Table 1, all of the Examples exhibited an excellent stretchability, film properties and stretch adaptability, and were considered excellent films for stretch packaging.

TABLE 1

|  |  | Example | | | | Comparative Example | | | |
|---|---|---|---|---|---|---|---|---|---|
|  |  | 1 | 2 | 3 | 4 | 1 | 2 | 3 | 4 |
| MFR 190° C. (g/10 min) |  | 3.2 | 6.1 | 3.1 | 3.2 | 2.2 | 2.1 | 4.0 | High-pressure process |
| Density (g/cm³) |  | 0.911 | 0.911 | 0.905 | 0.912 | 0.922 | 0.910 | 0.88 | Low density |
| $\overline{Mw}/\overline{Mn}$ |  | 3.8 | 3.0 | 3.2 | 4.1 | 4.2 | 5.5 | 2.2 | Polyethylene MFR = 3.3 |
| DSC | Peak number | 3 | 3 | 3 | 3 | 3 | 3 | 1 |  |
|  | $Tm_1$ | 122 | 122 | 121 | 123 | 124 | 123 | 65 | Density = 0.921 |
|  | $Tm_1H/Tm_2H$ | 0.8 | 0.7 | 0.5 | 1.0 | 1.6 | 1.5 | — | — |
| α-olefin | Kind | $C_6$ | $C_6$ | $C_6$ | $C_6$ | $C_6$ | $C_4$ | $C_4$ | — |
|  | mol % | 4.0 | 4.2 | 4.6 | 3.8 | 3.1 | 5.3 | 8.5 | — |
| Film properties | Tensile strength at break (kg/cm²) | 360 | 310 | 350 | 370 | 390 | 370 | — | 330 |
|  | Tensile elongation at break (%) | 450 | 520 | 510 | 440 | 380 | 440 | — | 250 |
|  | Impact strength (kg · cm/cm²) | 6600 | 6500 | Not broken | 5900 | 2000 | 1800 | — | 1000 |
|  | Tear strength (longitudinal/transversal) (kg/cm) | 100/800 | 150/190 | 110/180 | 130/190 | 90/150 | 40/170 | — | 15/170 |
|  | Tackiness (g/cm) (20 kg, 50° C. × 1) | 11 | 10 | 12 | 15 | 5 | Peeling difficult | Peeling difficult | 2 |
|  | 300% stretching (g/15 mm) (Force 1 hr after) | 250 | 210 | 200 | 230 | 350 | 250 | — | Broken |
| Stretch adaptability | Maximum stretching limit (%) | 600 | 600 or more | 600 or more | 600 or more | 200 | — | — | 50 |
|  | Irregular shape packaging ability | ⊚ | ⊚ | ⊚ | ⊚ | — | — | — | x |

We claim:

1. In a method for stretch packaging a plurality of articles by wrapping the articles in a stretchable film while stretching said stretchable film about said articles, the improvement comprising using as said stretchable film a multi-layer film for stretch packaging and having a non-tacky surface and a tacky surface, said multi-layer film comprising an intermediate layer of a linear low density polyethylene having a melt flow rate (190° C.), as measured by an ASTM-D-1238E method, of 0.3 to 8 g/10 min., a density, as measured by an ASTM-D-1505 method, of 0.900 to 0.918 g/cm³, a molecular weight distribution ($\overline{Mw}/\overline{Mn}$) of 2 to 6, two or more melting points existing as measured by a differential scanning calorimeter, a maximum melting point $Tm_1$ of 118° to 125° C. and a ratio of the height $Tm_1H$ of the peak of the highest melting point $Tm_1$ to the height $Tm_2H$ of the melting point $Tm_2$ adjacent thereto (i.e., $Tm_1H/Tm_2H$), of 1.3 or less, a non-tacky surface layer on one surface of said intermediate layer and comprising a non-tacky linear low density polyethylene having a density greater than 0.918 g/cm³, and, on the opposite surface of said intermediate layer, a tacky surface layer comprising a mixture of linear low density polyethylene having a melt flow rate (190° C.), as measured by an ASTM-D-1238E method, of 0.3 to 8 g/10 min., a density, as measured by an ASTM-D-1505 method, of 0.900 to 0.918 g/cm³, a molecular weight distribution ($\overline{Mw}/\overline{Mn}$) of 2 to 6, two or more melting points existing as measured by a differential scanning calorimeter, a maximum melting point $Tm_1$ of 118° to 125° C. and a ratio of the height $Tm_1H$ of the peak of the highest melting point $Tm_1$ to the height $Tm_2H$ of the melting point $Tm_2$ adjacent thereto (i.e., $Tm_1H/Tm_2H$), of 1.3 or less and from 2 to 10% by weight of liquid polyisobutylene or liquid polybutadiene, said non-tacky surface layer having a thickness of from about 5 to 30% of the total thickness.

2. A stretch packaging method as set forth in claim 1 wherein the linear low density polyethylene in each layer is an ethylene/α-olefin copolymer.

3. A stretch packaging method as set forth in claim 2 wherein the ethylene/α-olefin copolymer is a copolymer of 99.5 to 60 mol % of ethylene and 0.5 to 40 mol % of α-olefin having 4 to 10 carbon atoms.

4. A stretch packaging method as set forth in claim 1 wherein the linear low density polyethylene in the tacky surface layer has a melt flow rate of 0.5 to 5 g/10 min, a density of 0.900 to 0.915 g/cm³, a molecular weight distribution ($\overline{Mw}/\overline{Mn}$) of 2.3 to 5, and a ratio $Tm_1H/Tm_2H$ of 1.0 or less.

5. A stretch packaging method as set forth in claim 1 wherein the multi-layer film is stretched by at least 300%.

6. The stretch packaging method of claim 5 wherein the multi-layer film is stretched from 300% to 600%.

7. The stretch packaging method of claim 5 wherein each of the tacky and non-tacky surface layers have a thickness of from about 5 to 30% of the total thickness of the multi-layer film.

* * * * *